(12) United States Patent
Kaddoura

(10) Patent No.: US 11,563,679 B1
(45) Date of Patent: Jan. 24, 2023

(54) DISTRIBUTED LEDGER ADJUSTMENT IN RESPONSE TO DISCONNECTED PEER

(71) Applicant: ARCHITECTURE TECHNOLOGY CORPORATION, Eden Prairie, MN (US)

(72) Inventor: Maher N. Kaddoura, Maple Grove, MN (US)

( * ) Notice: Subject to any disclaimer, the term of this patent is extended or adjusted under 35 U.S.C. 154(b) by 16 days.

(21) Appl. No.: 16/946,230

(22) Filed: Jun. 11, 2020

Related U.S. Application Data

(60) Provisional application No. 62/947,428, filed on Dec. 12, 2019.

(51) Int. Cl.
| | | |
|---|---|---|
| G06F 15/173 | (2006.01) | |
| H04L 45/64 | (2022.01) | |
| G06F 16/23 | (2019.01) | |
| H04L 67/1097 | (2022.01) | |
| H04L 67/104 | (2022.01) | |

(52) U.S. Cl.
CPC .......... *H04L 45/64* (2013.01); *G06F 16/2379* (2019.01); *H04L 67/104* (2013.01); *H04L 67/1097* (2013.01)

(58) Field of Classification Search
CPC ............................. H04L 45/64; H04L 67/104
USPC ........................................................ 709/238
See application file for complete search history.

(56) References Cited

U.S. PATENT DOCUMENTS

| | | | | |
|---|---|---|---|---|
| 10,616,324 | B1 * | 4/2020 | Kaddoura | ............. H04L 69/329 |
| 2011/0228678 | A1 * | 9/2011 | Ricciulli | ................. H04L 45/28 |
| | | | | 370/238 |
| 2018/0019921 | A1 * | 1/2018 | Davis | .................. H04L 41/0836 |
| 2018/0254982 | A1 * | 9/2018 | Apostolopoulos | .... H04L 45/302 |
| 2019/0019180 | A1 | 1/2019 | Coburn et al. | |
| 2019/0303622 | A1 | 10/2019 | Versteeg et al. | |
| 2019/0373521 | A1 * | 12/2019 | Crawford | ............. H04L 9/3236 |
| 2020/0076610 | A1 * | 3/2020 | Wang | ................... H04L 9/3239 |
| 2020/0394162 | A1 | 12/2020 | Iizuka | |
| 2021/0104326 | A1 | 4/2021 | Lorenzo et al. | |
| 2021/0109797 | A1 | 4/2021 | Zhou | |
| 2021/0176038 | A1 | 6/2021 | Bortnikov et al. | |
| 2021/0250812 | A1 * | 8/2021 | Caswell | .................. H04L 45/44 |
| 2021/0334244 | A1 | 10/2021 | Takahashi et al. | |

OTHER PUBLICATIONS

Weston et al., Performance of blockchain technology on DoD tactical networks, May 2019, SPIE, All pages (Year: 2019).*
"Non-Final Office Action", U.S. Appl. No. 17/039,323, filed Feb. 11, 2022, 33 pgs.
"Notice of Allowance and Fee(s) Due", U.S. Appl. No. 17/039,323, filed Jun. 20, 2022, 13 pgs.
"Notice of Allowance and Fee(s) Due", U.S. Appl. No. 17/121,125, filed Jun. 1, 2022, 9 pgs.

* cited by examiner

*Primary Examiner* — Hee Soo Kim
(74) *Attorney, Agent, or Firm* — Carlson, Caspers, Vandenburgh & Lindquist P.A.

(57) ABSTRACT

Software implementing a distributed ledger that adjusts in response disconnected peers is provided. The software implements an overlay routing protocol to monitor one or more overlay links between a first peer and one or more second peers that are maintaining a distributed ledger. The software adjusts how blocks for the distributed ledger are formed in response to detecting the one or more second peers becoming disconnected from the peer.

18 Claims, 16 Drawing Sheets

Minimum Spanning Tree (MST)

Network Partition

Network Self-Healing

Minimum Spanning
Tree (MST)

US 11,563,679 B1

DISTRIBUTED LEDGER ADJUSTMENT IN RESPONSE TO DISCONNECTED PEER

RELATED APPLICATIONS

This application claims the benefit of U.S. Provisional Application No. 62/947,428 filed on Dec. 12, 2019, entitled "SCALABLE AND RELIABLE BLOCKCHAIN FOR LOW BANDWIDTH AND UNSTABLE NETWORKS", which is hereby incorporated herein by reference.

GOVERNMENT CONTRACTS

This invention was made with government support under contract W56KGU-19-C-0037 awarded by the U.S. Army. The government may have certain rights in the invention.

BACKGROUND

Distributed ledger protocols constitute the underlying technology for developing Peer-to-Peer (P2P) databases, which possess three attributes that traditional databases lack: 1) disintermediation: data is available to all the nodes; 2) high fault tolerance: the database will continue to operate even if a large percentage of its nodes are disabled; 3) immutability: it is impossible to falsify data once it is committed to the database. Current distributed ledger systems fail, however, when deployed in low-bandwidth and disconnected-network environments, such as tactical networks.

BRIEF DESCRIPTION

Embodiments for a program product comprising a non-transitory processor readable medium having software stored thereon are provided. The software, when executed by one or more processing devices, is configured to send and receive messages with one or more peers to maintain a distributed ledger and implement an overlay routing protocol to monitor one or more overlay links between peers of the distributed ledger. The software also configured to adjust how blocks for the distributed ledger are formed in response to an edge network of peers becoming disconnected from a core network of peers.

Embodiments for a device having one or more processing devices and storage media communicatively coupled to the one or more processing devices are also provided. The storage media includes software stored thereon. The software, when executed by the one or more processing devices is configured to send and receive messages with one or more peers to maintain a distributed ledger and implement an overlay routing protocol to monitor one or more overlay links between peers of the ledger. The software is also configured to adjust how blocks for the ledger are formed in response to an edge network of peers becoming disconnected from a core network of peers.

Embodiments for a method for one or more ledgers are also provided. The method includes sending and receiving messages with one or more peers to maintain a ledger and implementing an overlay routing protocol to monitor one or more overlay links between peers of the ledger. The method also includes adjusting how blocks for the ledger are formed in response to an edge network of peers becoming disconnected from a core network of peers.

DRAWINGS

Understanding that the drawings depict only exemplary embodiments and are not therefore to be considered limiting in scope, the exemplary embodiments will be described with additional specificity and detail through the use of the accompanying drawings, in which.

Figure 11:
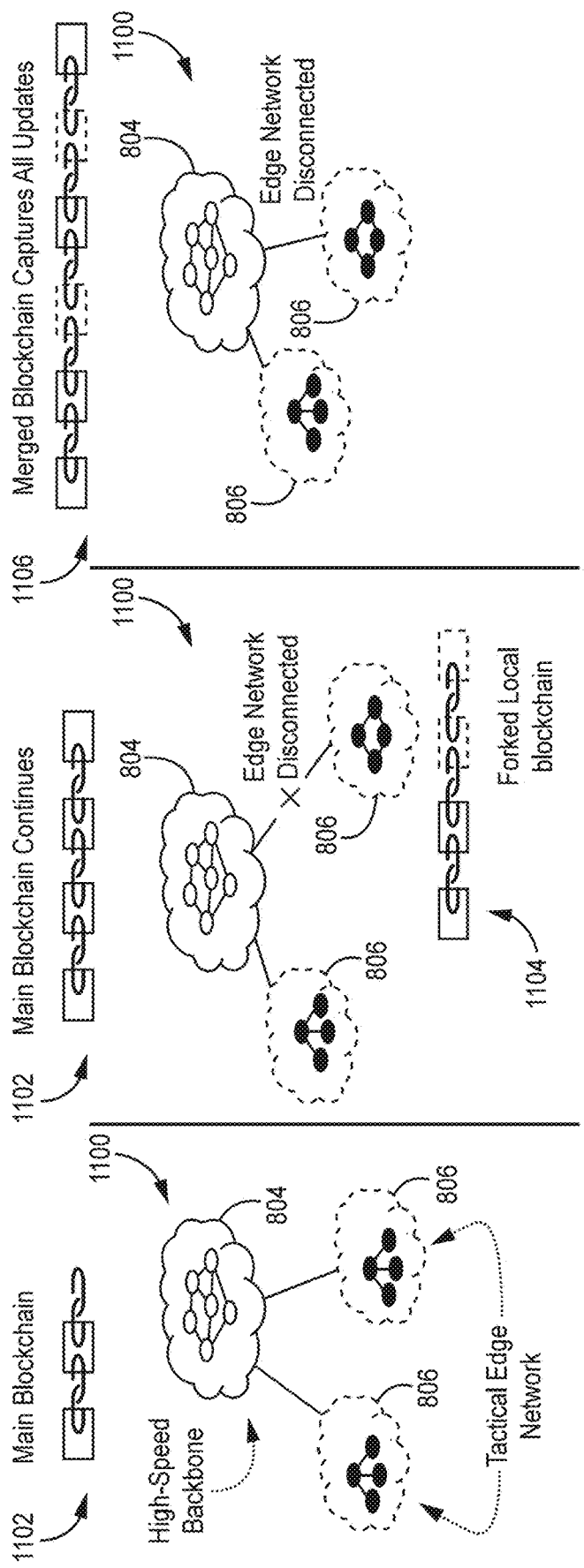
Figure 12:
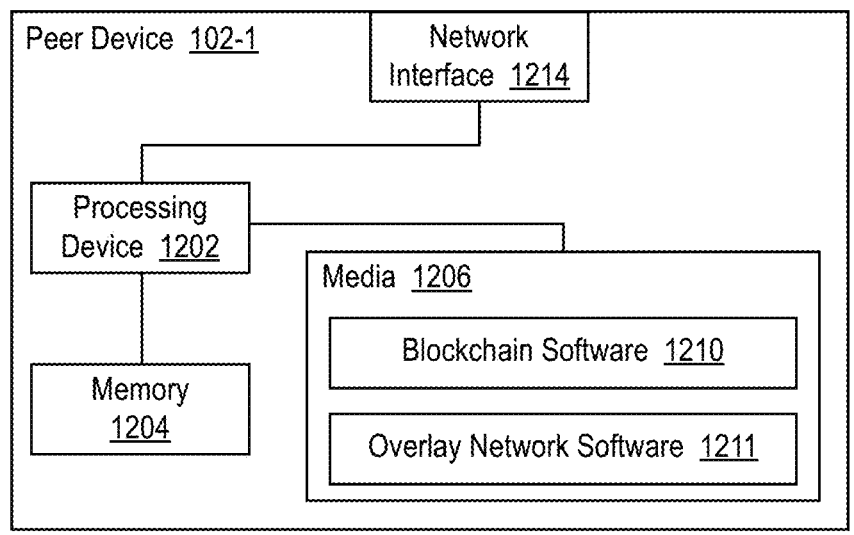
Figure 13:
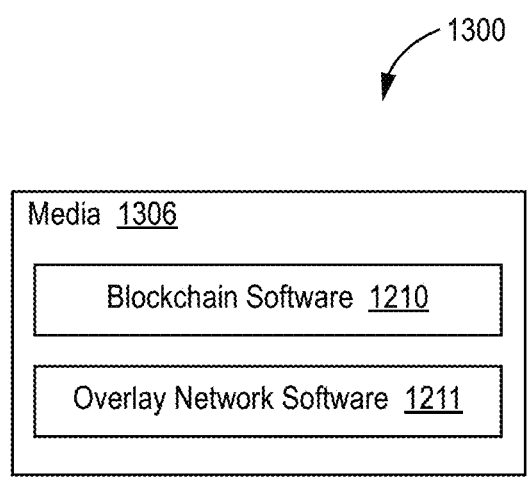
Figure 14A:
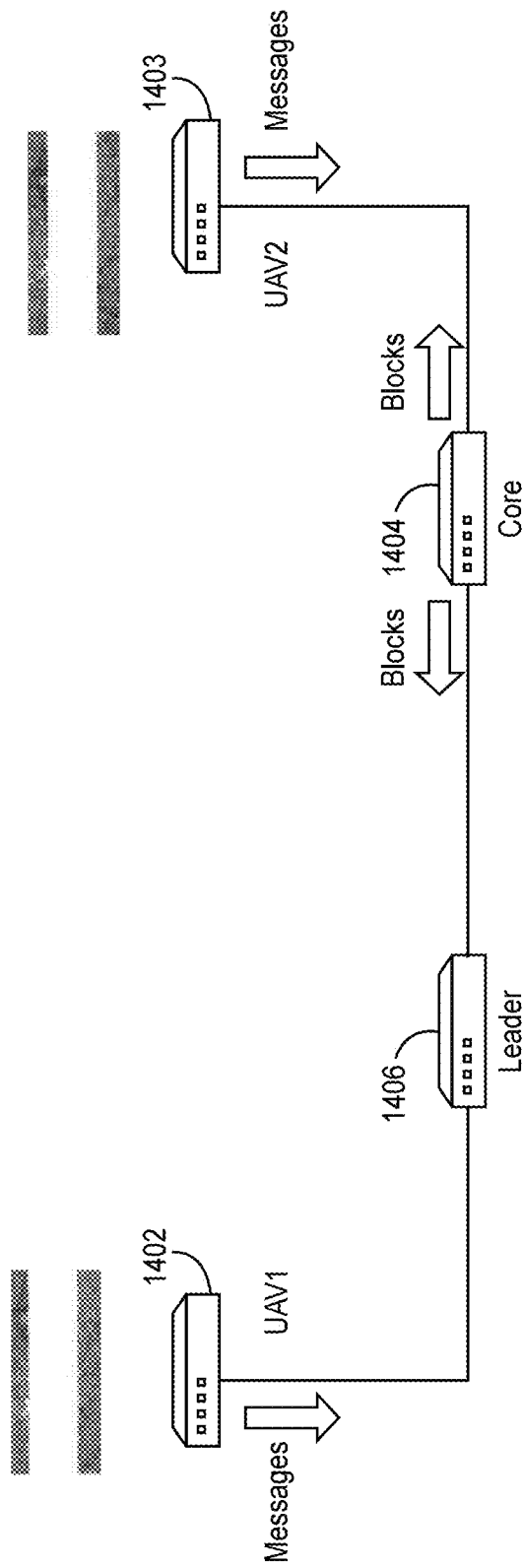
Figure 14B:
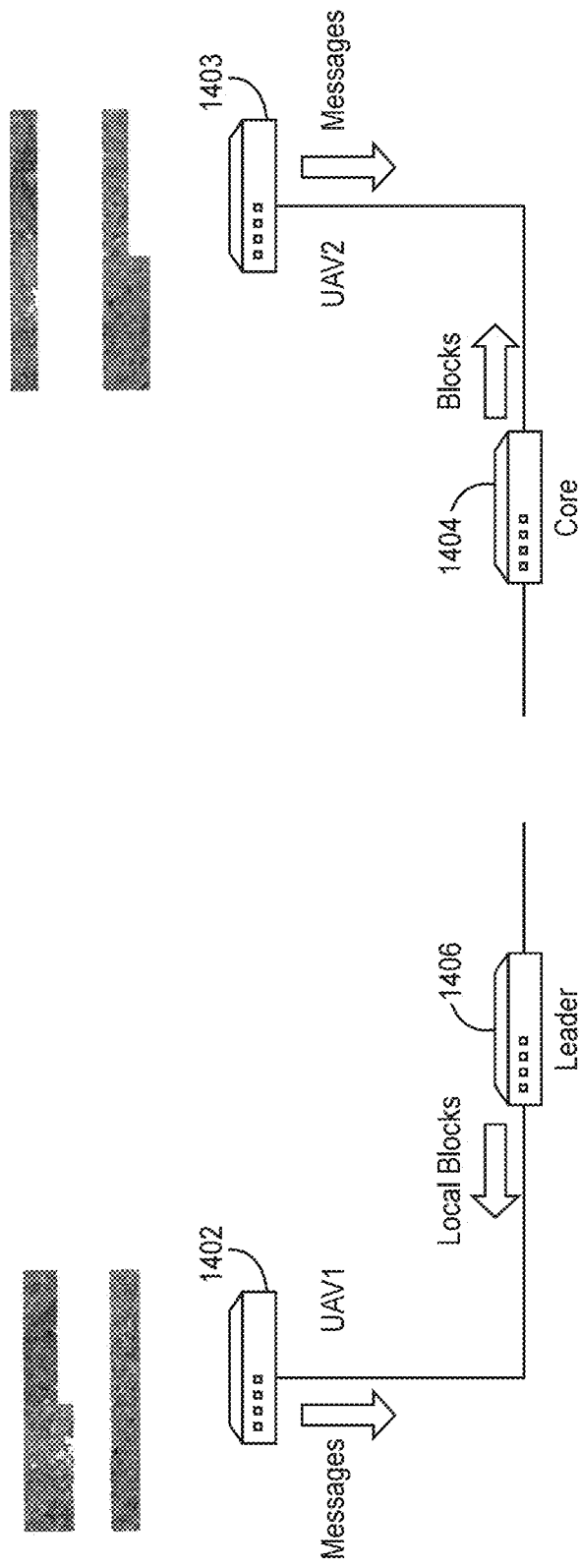
Figure 14C:
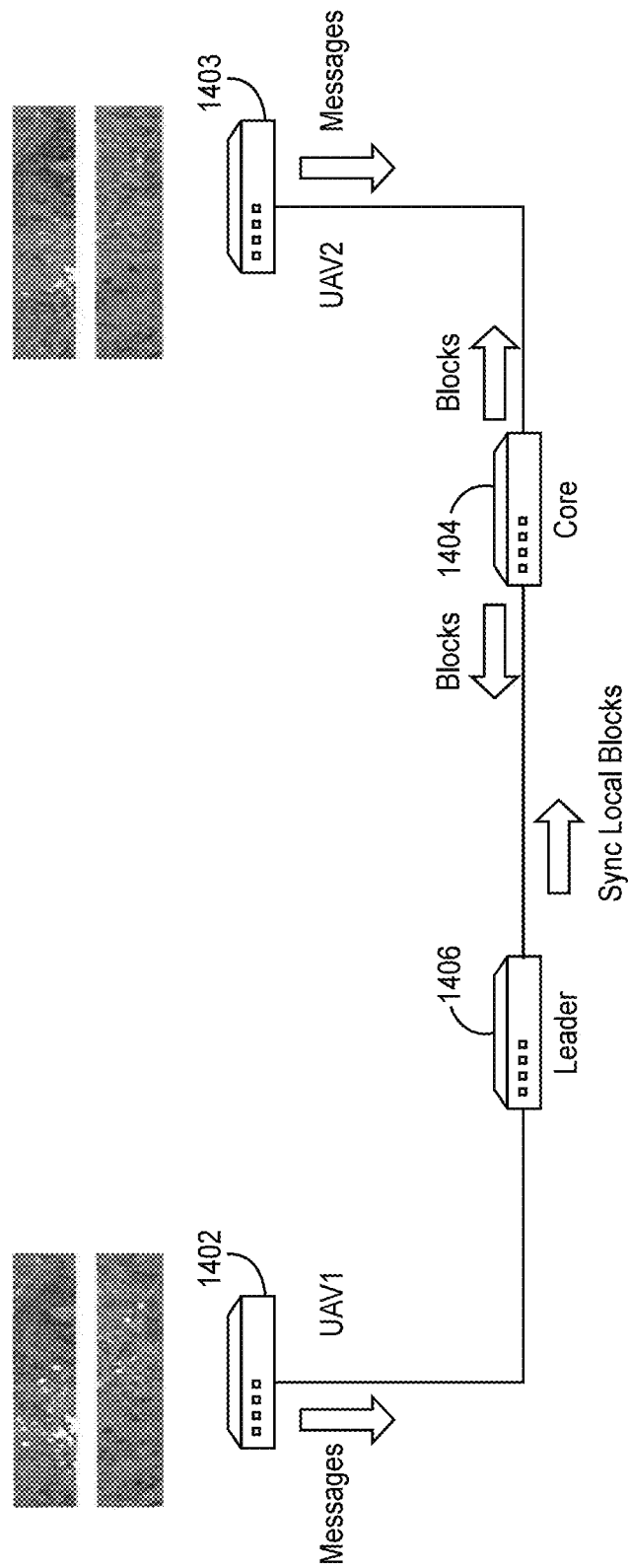

FIGS. 11A, 11B, and 11C are block diagrams of example overlay network during periods of disconnection and reconnection;

FIG. 12 is a block diagram of an example ledger peer;

FIG. 13 is a block diagram of an example program product including ledger software for implementing the ledger protocol described herein; and FIGS. 14A-14C are block diagrams of an example network implementing a distributed ledger during periods of normal operation, disconnection, and reconnection.

DETAILED DESCRIPTION

Figure 1:
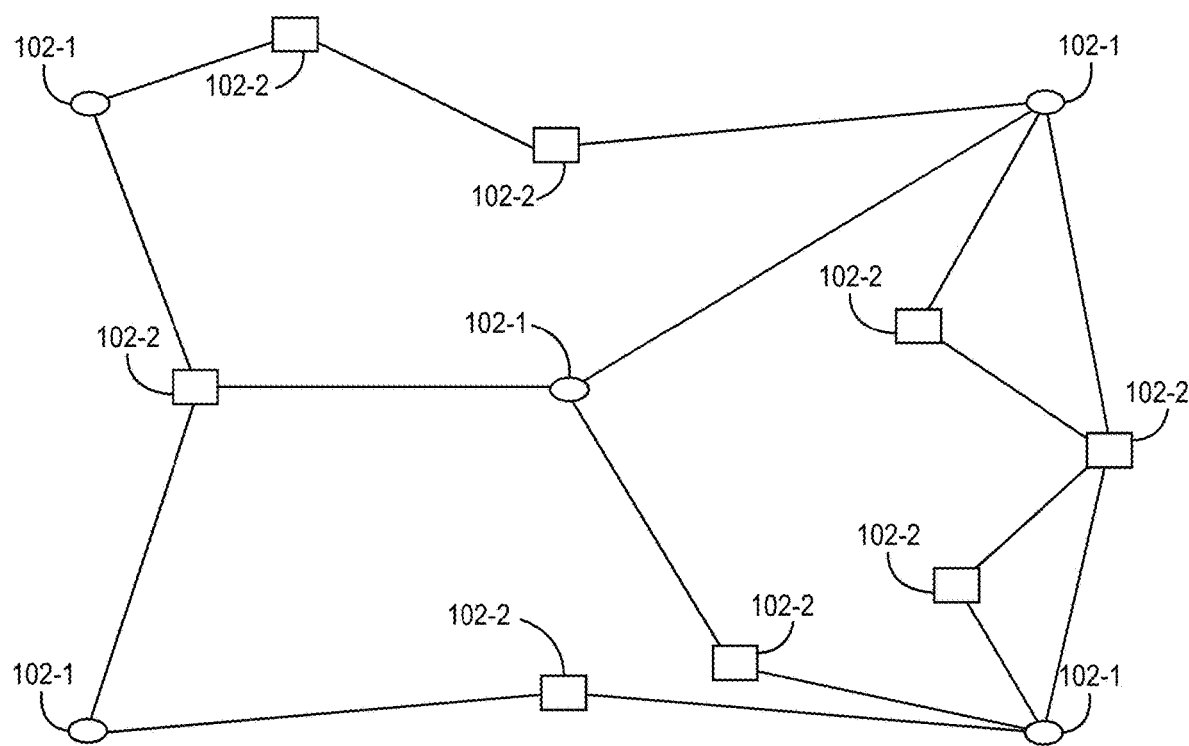
FIG. 1 is a block diagram of an example network that implements a P2P distributed ledger database that accounts for low-bandwidth and unstable network links.

FIG. 1 is a block diagram of an example network 100 that implements a P2P distributed ledger database that accounts for low-bandwidth and unstable network links. In an example, the distributed ledger is a blockchain. FIG. 1 includes a plurality of nodes that are communicatively coupled together via a plurality of network links 101. Each network link 101 can be a physical link implemented over one or more physical communication media (e.g., an Ethernet cable such as a cat-5E compliant cable) or can be a wireless link implemented using wireless signals. All or a portion of network 100 can communicate information via packets that conform to the internet protocol (IP) and/or can communicate information via a non-IP protocol (e.g., a SATCOM protocol).

The network nodes 102 can include ledger peers 102-1 and non-ledger peers 102-2. Ledger peers 102-1 are nodes that are members of a set, which implements a common ledger protocol to communicate messages amongst the ledger peers 102-1 in order to create and maintain one or more distributed ledgers. In an example, each ledger peer 102-1 obtains a copy of the one or more ledgers maintained by the set of ledger peers 102-1. Non-ledger peers 102-2 are nodes that communicate in the network 100, but do not implement the ledger protocol of the ledger peers 102-1. The ledger peer nodes 102-1 and non-ledger peer nodes 102-2 can be any device capable of communicating with other nodes 102 in the network 100. This includes a mobile device such as a mobile phone, laptop, communications radio (e.g., tactical radio), a radio platform for installation in heavy equipment (e.g., military equipment, construction equipment), a wireless wearable device, or a wireless sensor. This also includes manned and unmanned vehicles with communication capabilities, such as heavy equipment, an automobile, an aircraft, or watercraft. This also includes networking devices such as a hub, switch, or router. Each ledger peer 102-1 includes ledger software to implement the ledger protocol thereon.

The plurality of nodes 102 implement one or more network protocols (e.g., IP) to effectuate communication amongst one another through the network 100. In an example, the network 100 sends IP packets to communicate information through the network 100. The ledger protocol implemented by the ledger peers 102-1 implements an overlay network protocol that controls communication of ledger messages/information amongst the ledger peers 102-1. The overlay network protocol operates on top of the (regular) network protocol(s). That is, the overlay network protocol communicates ledger messages/information amongst the ledger peers 102-1 by sending the ledger messages/information via the packets of the regular network protocols thereby using both ledger nodes 102-1 and non-ledger nodes 102-2 of the network 100 to transport the ledger messages/information amongst the ledger peers 102-1.

The overlay network protocol monitors overlay network links between ledger peers 102-1 and implements aspects of the ledger protocol based on the characteristics of the overlay network links. An overlay network link (also referred to herein as simply an "overlay link") is a logical communication path between two ledger peers 102-1. An overlay link starts at a first ledger peer 102-1 and ends at a second ledger peer 102-1. The overlay network protocol can send a ledger message/information over an overlay link to communicate that message/information from one ledger peer 102-1 to another ledger peer 102-1. The overlay link can include a single (regular) network link directly coupling the first ledger peer 102-1 to the second ledger peer 102-2 or the overlay link can include multiple regular network links such that the overlay link traverses one or more intermediate non-ledger nodes 102-2. Accordingly, a packet corresponding to a ledger message/information can hop through one or more non-ledger nodes 102-2 as it traverses a single overlay link.

Figure 2:
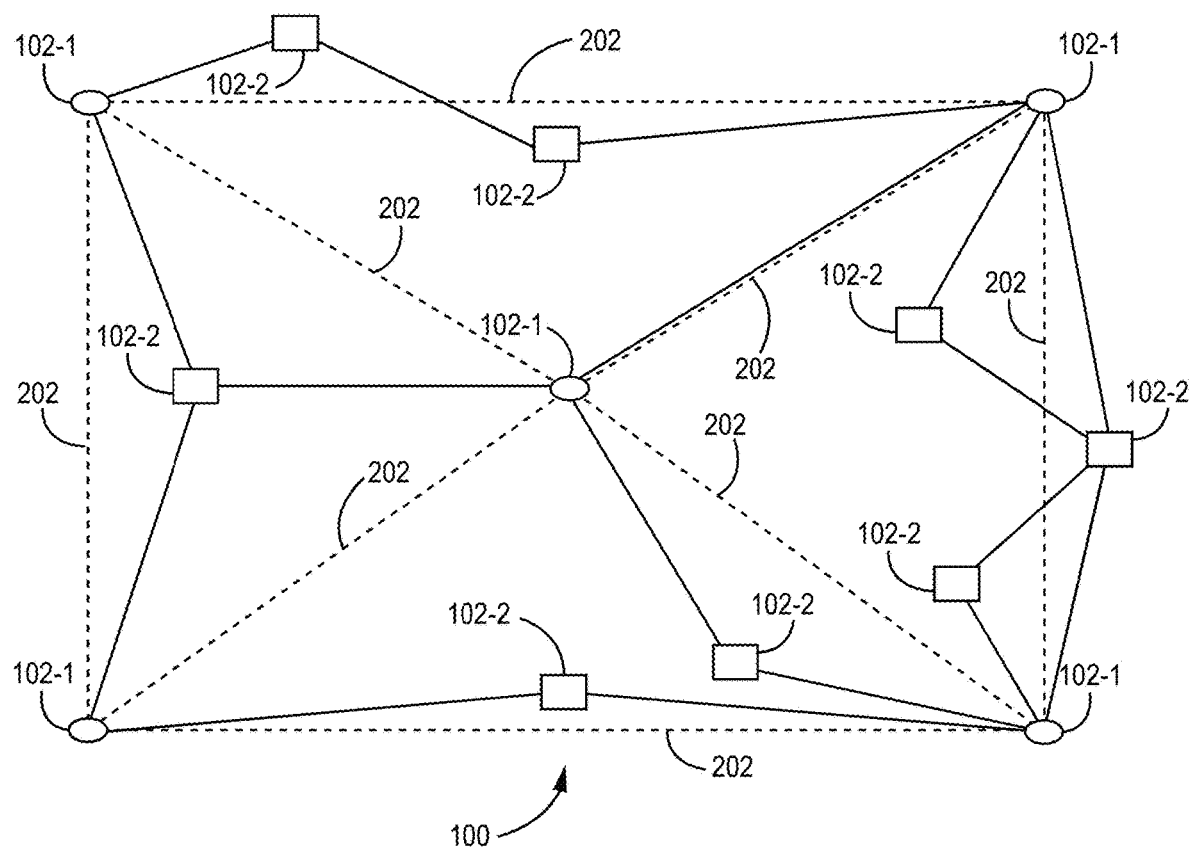
FIG. 2 is a modified version of FIG. 1 illustrating the overlay links between peers.

FIG. 2 is a modified version of FIG. 1 illustrating the overlay network links 202 between ledger peers 102-1. As mentioned above, the overlay network protocol uses the overlay links to send ledger messages/information amongst the ledger peers 102-1. The overlay network protocol can implement an overlay routing protocol to control how ledger messages/information are routed amongst the ledger peers 102-1. To implement such a routing protocol, the overlay network protocol assigns and monitors the overlay network links 202. Assigning an overlay link 202 refers to the act of selecting which two ledger peers 102-1 make up the endpoints of a given overlay link 202. Two ledger peers 102-1 that make up the endpoint of an overlay link 202 are referred to herein as "neighbors". By assigning ledger peers 102-1 as endpoints of specific overlay links 202 the overlay network protocol establishes an overlay network amongst the peers 102-1.

Neighboring peers 102-1 can be assigned based on characteristics of the (regular) network links 104 forming the path between peers 102-1. The overlay network protocol can be configured to set up overlay links such that no ledger peers 102-1 are an intermediary point for an overlay link 202. For example, if a first peer 102-1 is communicatively coupled to a third peer 102-1, but the network path from the first peer 102-1 to the third peer 102-1 travels through a second peer 102-1, the overlay protocol will not assign a overlay link between the first peer 102-1 and the third peer 102-1. Instead, the overlay protocol will assign a first overlay link between the first peer 102-1 and the second peer 102-1, and a second overlay link 202 between the second peer 102-1 and the third peer 102-1.

Other characteristics used can be the stability, bandwidth, whether a network path exists to a peer, and/or packet loss of a network path. For example, if a first peer 102-1 has network paths to multiple other peers 102-1, the overlay protocol can select which of the other peers 102-1 are neighbors based on the stability, bandwidth, and/or packet loss of the network paths between those peers 102-1. That is, the overlay routing protocol can select neighbors having network paths therebetween with higher stability, bandwidth, and/or lower packet loss. In an example, stability of an overlay link can be a percentage of time the overlay link is disconnected.

Figure 3:
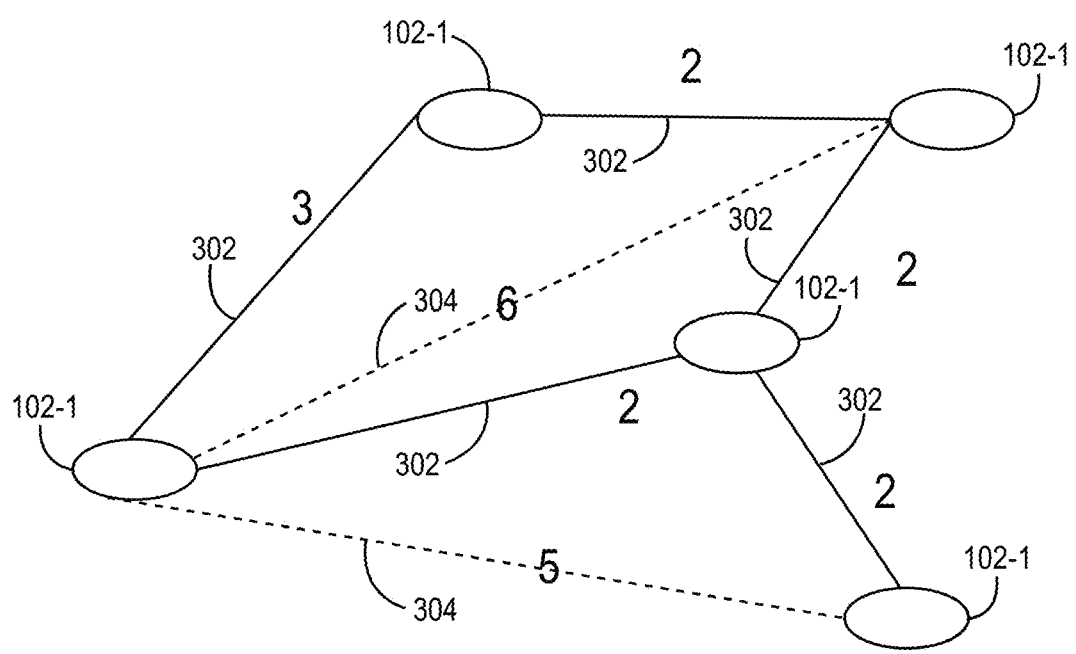
FIG. 3 is a block diagram of another example of an overlay network in which non-ledger nodes are not shown.

FIG. 3 is another example of an overlay network 300, in which the non-ledger nodes 102-2 are not shown. Thus, overlay network 300 illustrates the ledger peers 102-1 and overlay network links 302 between the peers 102-1. The overlay routing protocol can use the open shortest path first (OSPF) protocol. OSPF computes network metrics (e.g., bandwidth, delay, packet loss), which will result in a graph as shown in FIG. 3 that describes the network topology with labeled edges (each corresponding to an overlay link) between any two directly coupled peers 102-1. A single peer 102-1 uses the graph to compute the final topology of the overlay network 300 and distributes it to the other peers 102-1.

The algorithm executed by the peers 1020-1 for building the final topology can work as follows. The algorithm will iterate over all the peers 102-1 in the graph. For each peer 102-1, the algorithm examines all possible overlay links and deletes any (direct) overlay link to a peer 102-1 if the algorithm can find a non-direct path to the same peer 102-1 with a cumulative delay that is less than or equal to the direct one. The algorithm can use Floyd's all-pairs-shortest path. In such a situation, the algorithm complexity will be O(N3), where N is the number of peers 102-1 in the graph. For example, the example in FIG. 3 illustrates the overlay links with delay numbers (higher=longer delay) along the corresponding link/edge. The algorithm would remove the dotted lines 304 in FIG. 3 because non-direct optimal paths exist.

Figure 4:
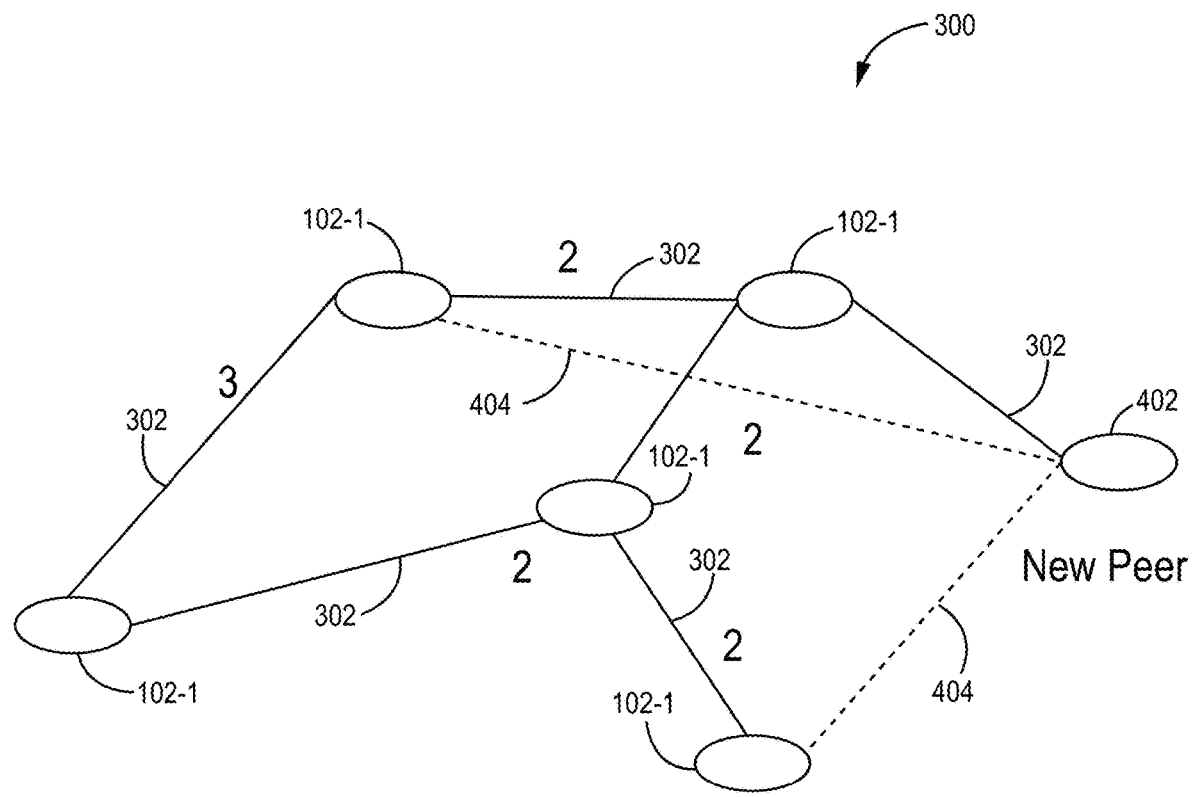
FIG. 4 is a block diagram of another example of an overlay network illustrating a new peer joining.

FIG. 4 is a block diagram of the overlay network 300 while a new peer 402 is joining the network. The new peer 402 that wants to join the network 300 can randomly select several neighbor peers based on a list of available peers 102-1 provided by an existing peer 102-1 that is designated as a rendezvous peer 102-1. The new peer 402 can then use its link sensing mechanism to choose the most optimal neighbors based on characteristics of potential overlay links to the other peers 102-1. The dotted lines 404 of FIG. 4 illustrate the overlay links selected for new peer 402.

Figure 5A:
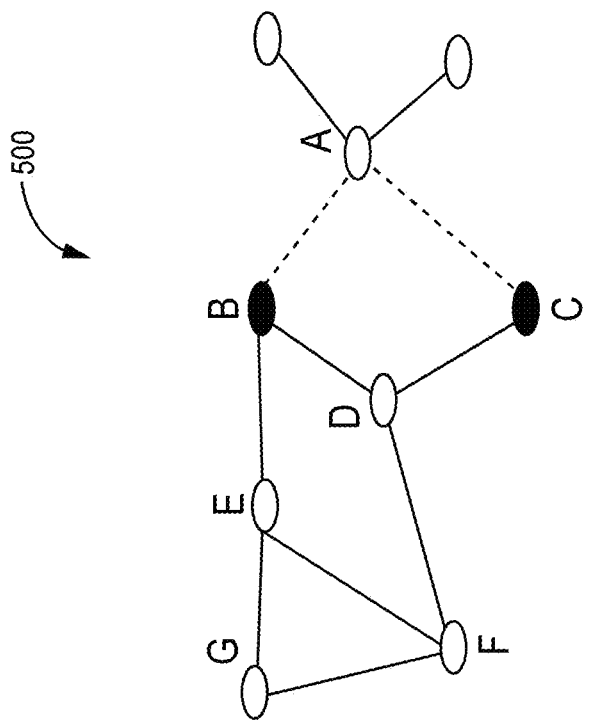
FIGS. 5A and 5B are block diagrams of another example overlay network that can adjust overlay links dynamically based on monitoring characteristics of the overlay links.
Figure 5B:
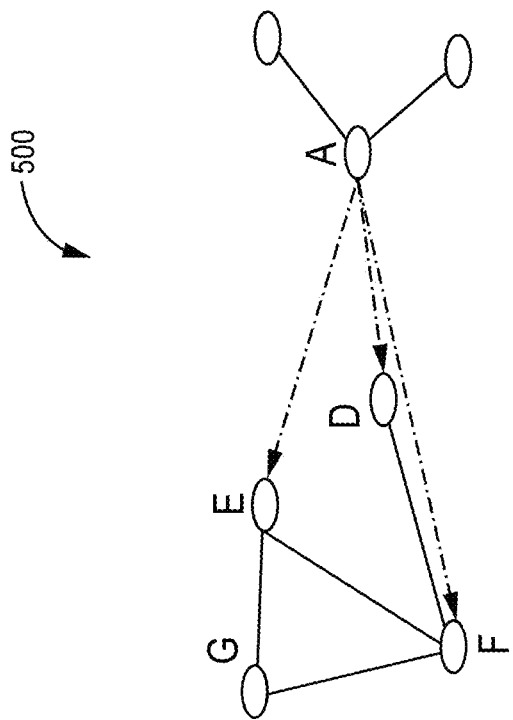

FIGS. 5A and 5B are block diagrams of another example of an overlay network 500 that can adjust overlay links dynamically based on monitoring characteristics of the overlay links. The peers 102-1 can monitor overlay links to detect when any peers 102-1 become disconnected from the overlay network 500. If a peer 102-1 becomes disconnected, part of the network 500 will disappear from the routing table. Peers 102-1 that experience overlay link failures due to this will try to heal the network 500 by establishing new overlay links. In FIGS. 5A and 5B, peer A heals the network 500 by establishing new overlay links to peers E, D, and F in response to detecting that peers B and C have become disconnected. Peer A selects the new overlay links based on link sensing the characteristics of potential overlay links.

Figure 6:
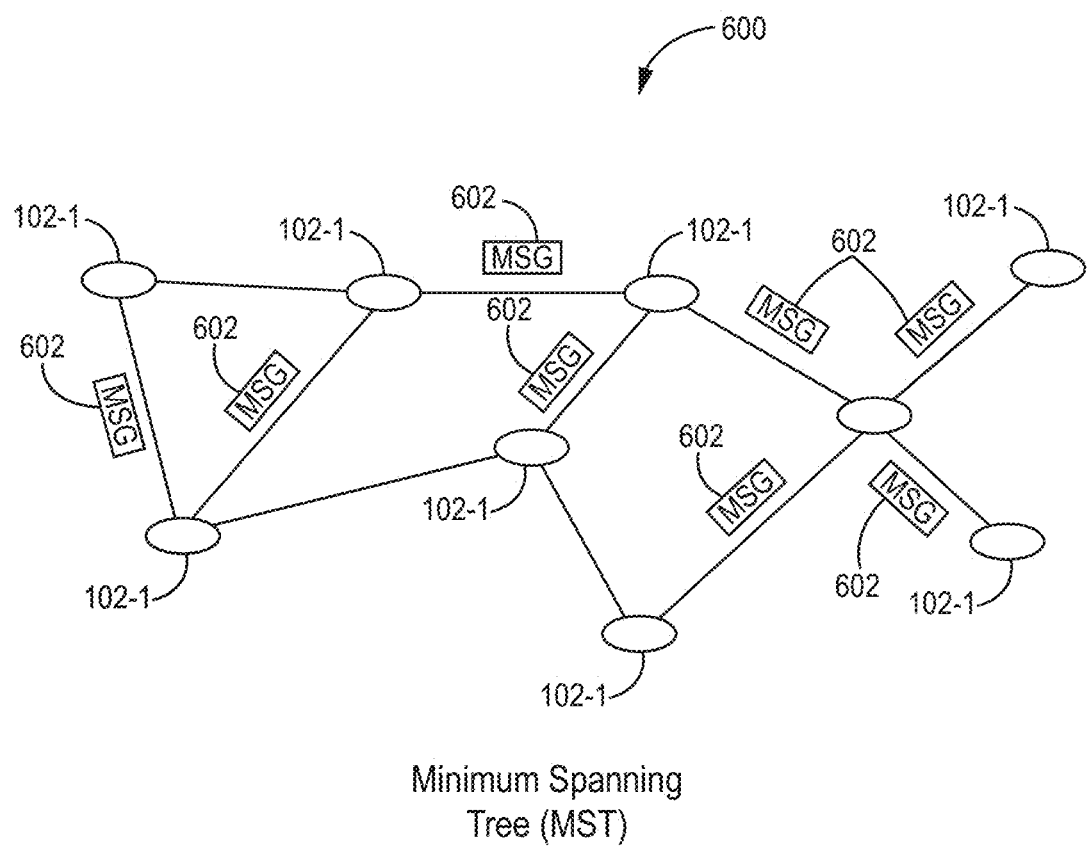
FIG. 6 is a block diagram of another example overlay network that implements a minimum spanning tree (MST) protocol.

FIG. 6 is a block diagram of another example of an overlay network 600 that routes ledger messages/information based on monitoring characteristics of the overlay links. In an example, the peers 102-1 can select which of multiple routing protocols to use to send ledger messages/information to the peers 102-1 of the network 600. In an example, the routing protocol is configured to send each ledger messages/information to all peers 102-1 in the network 600. Accordingly, the routing protocols to select from can include a minimum spanning tree (MST) protocol or a control flooding protocol. If the overlay links are sufficiently stable, the peers 102-1 select the MST protocol in order to efficiently utilize overlay links between the peers 102-1. If the overlay links are not sufficiently stable, the routing protocol can select a control flooding protocol to provide more opportunity for each ledger message/information to be received by each peer 102-1.

FIG. 6 illustrates an example message 602 sent using an MST protocol. For MST, the peers 102-1 can compute an MST that connects them. The peers 102-1 then forward messages 602 across the MST. The peers 102-1 can compute a minimum weight spanning tree based on the applications sending messages/information for the ledger(s). For example, if the applications send messages/information at a higher rate (e.g., above a threshold rate based on a number of messages and/or size), the MST can be computed to efficiently utilize bandwidth between the peers 102-1. On the other hand, if the applications are sensitive to delays (e.g., request a delay that is less than a threshold), then the MST can be computed to provide reduced delay across the network 600. The peers 102-1 can exchange messages with the applications to identify parameters of the applications such as message rate and/or delay threshold. In other examples, the peers 102-1 can monitor ledger messages/information sent by the applications to identify parameters of the messages and then set the parameters of the MST based thereon.

Figure 7:
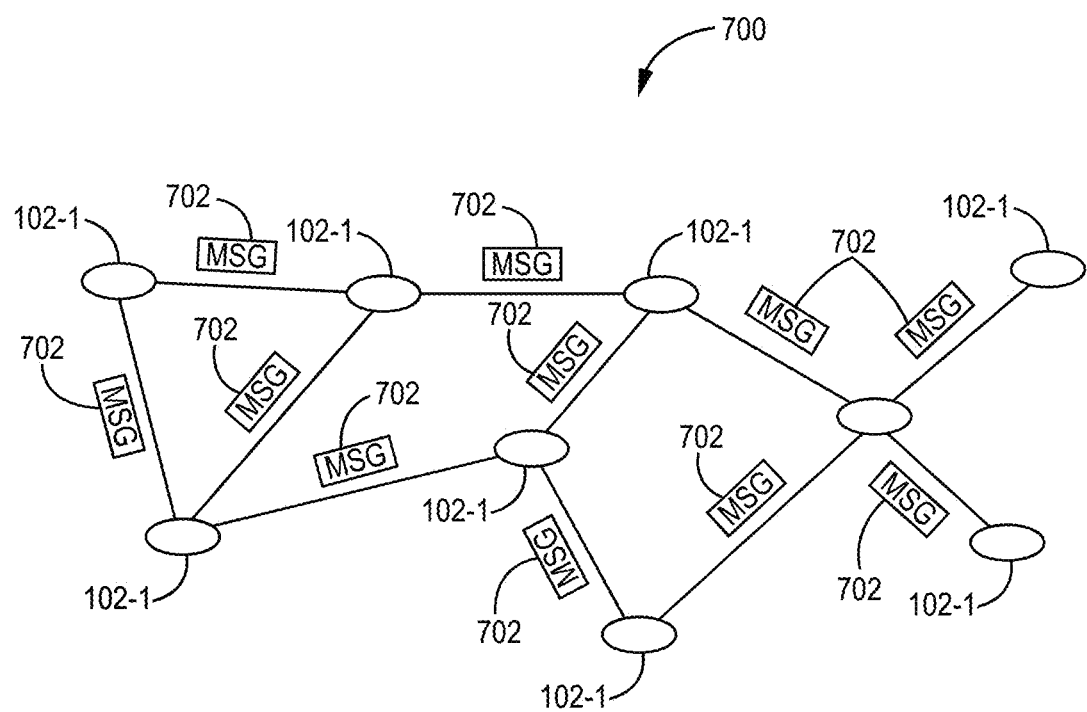
FIG. 7 is a block diagram of another example overlay network that implements a control flooding protocol.

FIG. 7 is a block diagram of an example network 700 that implements a control flooding protocol. In this protocol, when any peer 102-1 in network 700 receives a new message 702, the peer 102-1 will forward the ledger message along all overlay links except for the link that the message 702 was received on.

Figure 8:
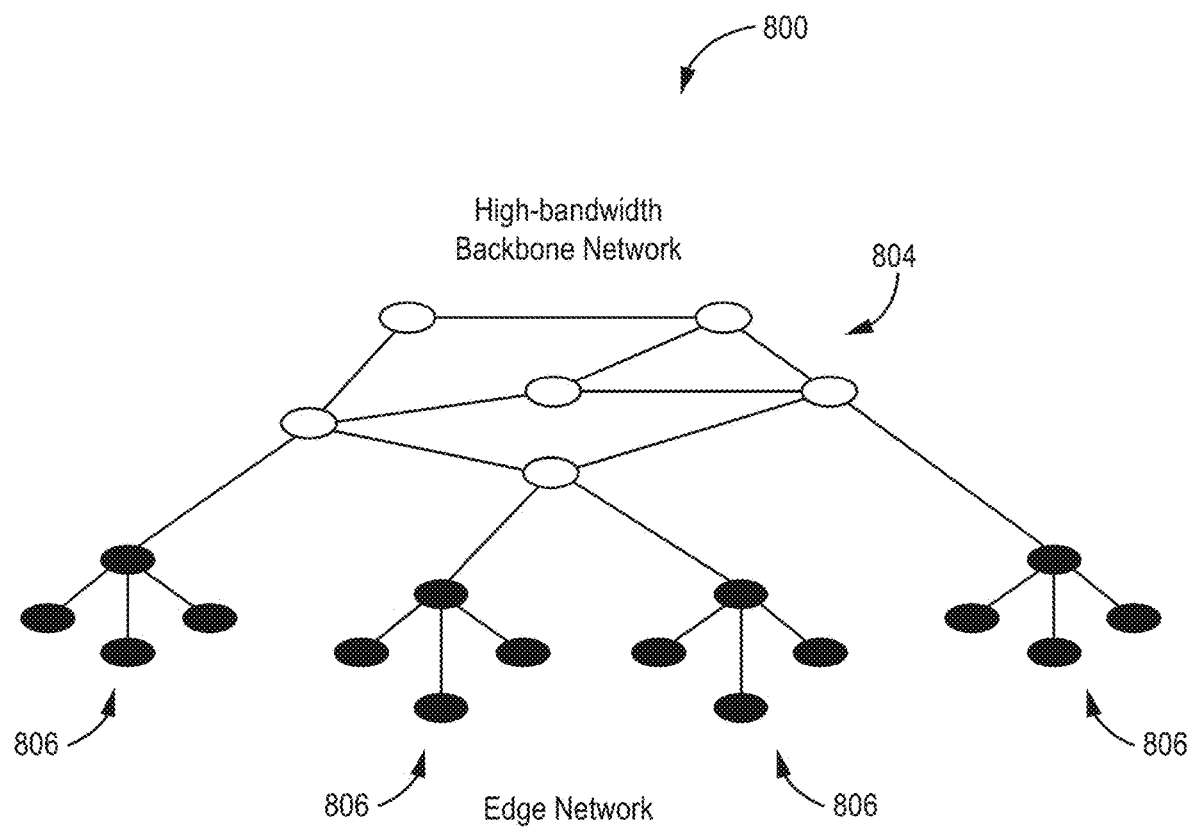
FIG. 8 is a block diagram of another example overlay network that is composed of multiple networks.

FIG. 8 is a block diagram of another example overlay network 800. In an example, the overall overlay network 800 can be divided up into different portions and each portion can be set-up and managed individually by the peers 102-1 of that portion. Example network 800 is divided into 5 different portions. The 5 portions include one core network 804 and four edge networks 806. An edge network 806 can also be referred to as a tactical edge network (TEN).

In an example, each peer 102-1 can be manually configured with information identifying the edge/core network 804, 806 of which that peer 102-1 is a part. When the peers 102-1 are communicatively coupled together, the peers 102-1 can identify other peers 102-1 in their core/edge network 804, 806 and implement the overlay routing protocol to set-up and manage their core/edge network independently of other core/edge networks. For example, if a peer 102-1 has information indicating that it is in the core network 804, the peer 102-1 implements its overlay network protocol based thereon.

In an example, the peers 102-1 can select neighbors and a routing protocol based on which core/edge network 804, 806 the peer 102-1 is a part of. For example, neighboring peers 102-1 for overlay links can be limited to peers 102-1 that are within the same core/edge network 804, 806. This effectively creates separate routing spaces for each network 804, 806. The exception to limiting neighbors is for peers 102-1 in an edge network 806 that are selected as leaders. The overlay protocol can select one peer 102-1 in each edge network 806 as leader for that network 806. The leader can identify one or more overlay links between itself and the core network 804. The overlay link(s) between the leader and the core network 804 are used to transfer ledger messages/information between the edge network 806 and the core network 804. As another example of individual network set-up and management, each core/edge network 804, 806 can select a routing protocol independently based on the characteristics of the overlay links in that network. For example, if a first edge network 806 has sufficiently stable overlay links, the first network 804 can implement the MST routing protocol, while a second edge network 806 implements a control flooding protocol. Notably, the first edge network and the second edge network can implement these different routing protocols while cooperating to send ledger messages/information for one or more common ledger databases. Thus, a single ledger system can implement diverse protocols in different networks to optimize message distribution based on individual characteristics of those networks.

Peers 102-1 can be selected to be in the core network 804 based on the characteristics of peer 102-1 itself, the characteristics of the peers 102-1 potential overlay links with other peers 102-1 in the core network 804, or a local area network (LAN) of which the peer 102-1 is a part. For example, if a peer 102-1 has sufficiently high processing performance and has one or more sufficiently stable and high bandwidth links to other peers 102-1 in the core network 804 the peer 102-1 can be indicated as part of the core network. In other examples, the selection of which network a peer 102-1 is a part of can be based on a local area network (LAN) that the peer 102-1 is a part of. That is, the peer 102-1 can be set as part of the same network as other peers 102-1 in that peer's 102-1 LAN.

Figure 9:
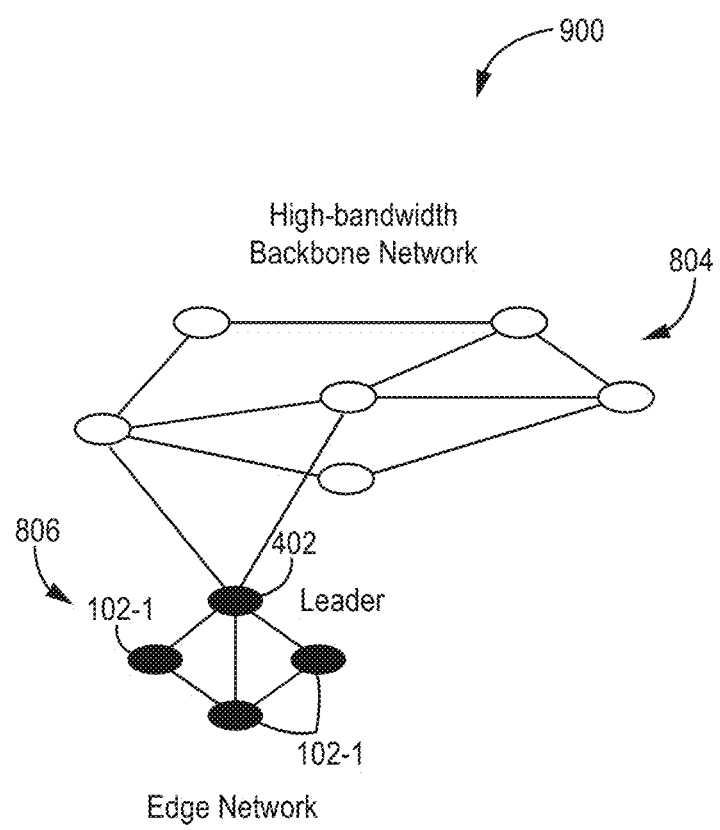
FIG. 9 is a block diagram of another example overlay network having an edge network with a leader.

FIG. 9 is a block diagram of an example overlay network 900 illustrating a leader peer 902 for an edge network 806. In an example, the peers 102-1 in an edge network elect a leader 902 for their network 806. The leader 902 is selected from the peers 102-1 within the network. The leader 902 establishes and maintains the overlay links with the core (backbone) network 804. The leader 902 leader can establish one or more overlay links with one or more core peers 102-1 and monitor these overlay links for failures. If an existing overlay link with the core network 806 becomes disconnected, the leader 902 will try to establish a new overlay link to the core 806. The peers 102-1 in the edge network 806 can select their leader 902 based on attributes that can be manually set. The attributes to be set can include characteristics of potential overlay links with the core 804 and computing resources of the peer 102-1. For example, a leader 902 can be selected as a peer 102-1 have a threshold level of computing resources and the best potential overlay link with the core 804. In an example, the leader 902 can be the gateway between the edge network 804 and the core 806.

Peers 102-1 in a particular network 804, 806 can utilize three mechanisms to set-up the overlay links in their network. First peers 102-1 can be manually set with initial neighbors. Second peers 102-1 can send a discovery packet across their network asking peers 102-1 that are within a certain distance (e.g., hop count) to respond. This will work if the network supports multicast. If the network is distributed across multiple autonomous systems, this may not work because the gateways that connect the autonomous systems may drop the multicast messages.

As mentioned above, a new peer 102-1 can also use rendezvous peers 102-1 to discover other peers 102-1. The new peer 102-1 can be manually configured with the identity of a rendezvous peer 102-1 in their network. The rendezvous peer 102-1 can be configured to send new peers 102-1 an indication of all the other peers 102-1 in the network and/or all peers 102-1 in the larger overall network. Overlay link(s) to the new peer 102-1 can then be established as discussed above.

The distributed ledger(s) maintained by the peers 102-1 includes a list of records. Each record, which is also referred to herein as a block, includes information corresponding to ledger message/information from a peer 102-1. In an example, peers 102-1 in edge networks 806 do not create blocks for the ledger themselves or participate in committing of blocks to the ledger. Instead, peers 102-1 in edge networks 806 send ledger messages/information for block creation and commitment to the core network 804. Peers 102-1 in the core network 804 then perform the computationally intensive process of creating a block(s) from the ledger message/information and committing the block(s) to the ledger. Once the block has been created, the block can be distributed back to peers 102-1 in the edge networks 806 along with peers 102-1 in the core network 804. Using this process to limit block creation to peers 102-1 in the core network 804 can be advantageous in situations where the edge networks 806 have generally lower bandwidth and/or lower computational power peers 102-1 than the core network 804.

Distribution of ledger messages/information can also be limited based on network. First, ledger messages/information in an edge network can be distributed to all peers 102-1 in the edge network of which the message/information originated. For example, a ledger message/information from a peer 102-1 in a first edge network 806 can be distributed to all other peers 102-1 in the first edge network 806. Second, ledger messages/information can be distributed to the core network 804 regardless of which network the message originated in. Thus, a ledger message originating in the first network 804 can be distributed to all the peers 102-1 in the core network 804 in addition to peers 102-1 in the first edge network 806. Third, ledger messages/information from a given edge network 806 are not distributed to peers 102-1 in edge networks 806 from which they did not originate. Thus, a ledger message/information from the first edge network 806 is distributed to all peers 102-1 in the first edge network 806 and all peers 102-1 in the core network, but that message/information is not distributed to peers 102-1 in any other edge network 806. To restrict ledger messages/information from being distributed to other edge networks 806, peers 102-1 in the core network 804 can be configured not to transmit ledger messages/information to peers 102-1 in edge networks 806. Thus, the ledger messages/information will be distributed through the first edge network 806 of origin by virtue of the overlay routing protocol implemented by the first edge network 806. The leader of the first edge network 806 will also forward the ledger message/information to the core network 804. The overlay routing protocol of the core network 804 will distribute the message/information to all peers 102-1 of the core network 804, but the peers 102-1 of the core network 804 will not distribute the message/information to any edge networks 806. Thus, distribution of the message/information will be limited to the edge network of origin and the core network 804. Limiting message/information distribution in this way is another way to reduce bandwidth and processing requirements on the edge networks 806.

In an example, distribution of the blocks created from a ledger message/information is not limited, such that blocks are distributed to all peers 102-1 in all networks 804, 806, so that all peers 102-1 can have a copy of the ledger(s) being maintained. Thus, distribution of ledger messages/information can be limited, but distribution of the blocks corresponding to those messages/information is not limited.

In an example, peers 102-1 can use UDP retransmission protocol to reduce loss of ledger messages/information. When a peer 102-1 sends a ledger message/information to its neighbors using UDP and keep the ledger message/information until it receives an acknowledgement from its neighbors. If the peer 102-1 does not receive an acknowledgement for a particular ledger message/information, it assumes that the message got lost and resends it. A receiving peer 102-1 periodically sends acknowledgement messages to its neighbors.

Figure 10:
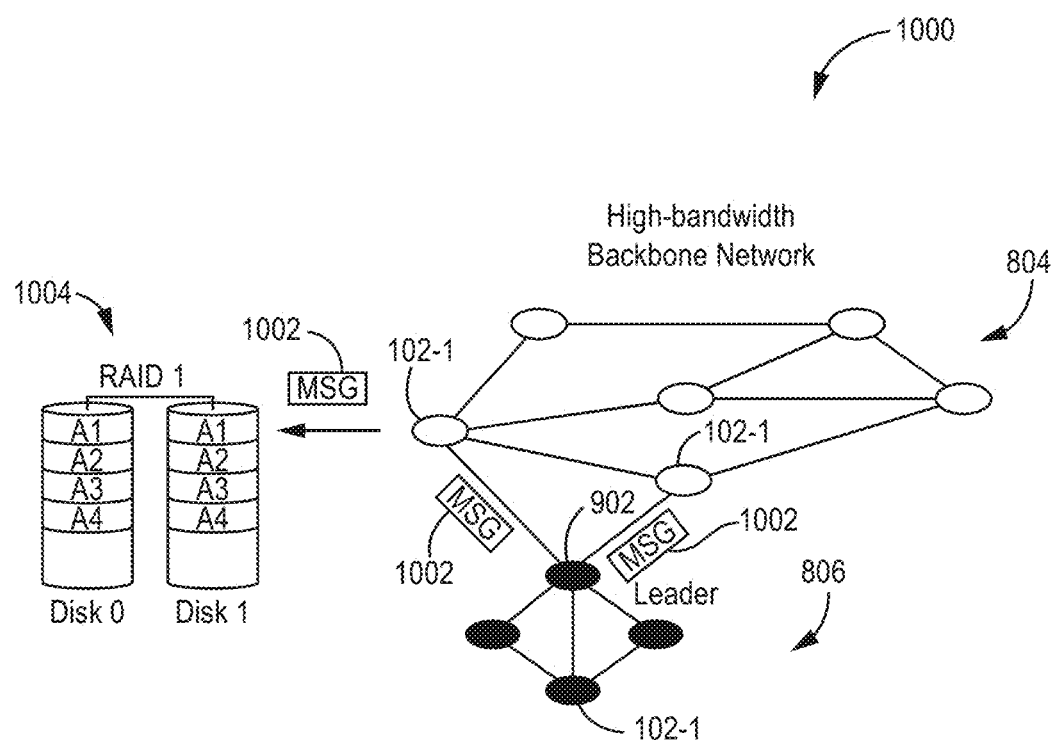
FIG. 10 is a block diagram of another example overlay network implementing schemes for fault tolerance of ledger messages/information.

FIG. 10 is a block diagram of an example overlay network 1000 in which fault tolerance for ledger messages/information is achieved. In an example, peers 102-1 in the core network can store ledger messages/information 1002 that originated from a peer 102-1 in an edge network on a stable storage system 1004, such as a redundant disk until the messages/information 1002 are committed into the ledger. In an example, a leader 902 of an edge network 806 can send each ledger message/information 1002 to multiple core peers 102-1 if possible, to achieve fault tolerance.

FIGS. 11A, 11B, and 11C are diagrams of an example network 1100 that can maintain a distributed ledger without loss of blocks even when a portion of the network 1100 becomes disconnected from another portion. As used herein, a portion of the network 1100 is disconnected from another portion while no path for communication of network (e.g., IP) packets exists between the two portions. In an example, the overlay protocol can monitor overlay links to identify when an edge network 806 is disconnected from the core network 804. The overlay protocol can also identify when an edge network 806 is reconnected to the core network 804. In an example, the peers 102-1 can send heartbeat messages throughout the network 800 to detect disconnections and reconnections of edge networks 806. The overlay protocol can then adjust how blocks for the ledger are formed in response to disconnection and reconnection of an edge network 806 in order to maintain a ledger with all blocks from both portions of a disconnected network.

FIG. 11A illustrates the network 1100 at a time in which a first and second edge networks 806 are connected (communicatively coupled) to the core network 804. During this time, peers 102-1 in the edge networks 806 can send their ledger messages/information to the core network 804 where all blocks are created and combined into a single (main) ledger 1102.

FIG. 11B illustrates the network 1100 at a time in which the second edge network 806 is disconnected from the core network 804. The overlay protocol monitoring the overlay links detect this disconnection and adjust creating of blocks so that blocks for messages/information from both disconnected portions ((core 804+first edge 806) and (second edge 806)) are maintained. During this time, the (main) ledger 1102 being maintained by the core network 804 does not capture messages/information from peers 102-1 in the second edge network 806, because the disconnection prevents the second network peers 102-1 from sending their ledger messages/information to the core network 804. In response to detecting the disconnection, the overlay protocol at the second edge network 806 begins to create blocks locally and adds the locally created blocks to its copy of the ledger. Meanwhile the core network 804 continues to create blocks based on the messages/information it receives and continues to add them to the main ledger 1102. This creates a forked local ledger 1104 at the second edge network 806. In an example, the peers 102-1 in the disconnected network 806 can elect one peer 102-1 to create the local blocks and manage maintenance of the forked ledger 1104. This election can be based on performance capabilities of the peers 102-1 and/or characteristics of the links to the peers 102-1. In an example, the leader peer 902 of the network 806 can create the local blocks and manage maintenance of the forked ledger 1104. The main ledger 1102 is maintained and continues to have new blocks added based on ledger messages/information received by the core network 1102. Both the main 1102 and forked 1104 ledgers continue to be created separately while the network 1100 is partitioned.

FIG. 11C illustrates the network 1100 at a time in which the second edge network 806 is reconnected to the core network 804. In response detecting reconnection of the second edge network 806, the overlay routing protocol merges the forked ledger 1104n with the main ledger 1102 to create a single merged ledger 1106. The single merged ledger 1106 can contain all the blocks from the main ledger 1102 and the forked ledger 1104 and will be the main ledger going forward. A single copy of duplicate blocks (e.g., blocks in both the main 1102 and forked 1104 ledgers that existed prior to disconnection) is kept in the merged ledger 1104. The formerly disconnected network discontinues creating local blocks and In an example, the overlay protocol can detect and adjust to multiple edge network disconnections that occur concurrently. For example, if the first edge network 806 becomes disconnected during the period in which the second edge network 806 is disconnected, the overlay protocol on the first edge network 806 and the core network 804 will adjust creation of blocks such that the first edge network 806 generates a forked ledger as described above. Thus, a first forked ledger will be created by the first edge network 806 at the same time as the second forked ledger is being created by the second edge network 806. Whenever the first edge network 806 reconnects with the core network 804, the overlay protocol will merge the forked ledger from the first edge network 806 with the main ledger maintained by the core network 804. Notably, if the first edge network 806 reconnects prior to the second edge network 806, the first forked ledger from the first edge network 806 will merge with the main ledger prior to merging of the second forked ledger from the second edge network 806. If the first edge network 806 reconnects after the second edge network 806, the first forked ledger will be merged with the main ledger, which would include the blocks from the second forked ledger, because the second forked ledger would have been previously merged with the main ledger maintained by the core network 804. Any number of forked ledgers can be created concurrently.

In an example, the overlay protocol can create and maintain multiple main ledgers concurrently, wherein each main ledger is a database for different information. For example, a first ledger can be a database containing information relating to images captured by one or more unmanned aerial vehicles (UAVs), and a second ledger can be a database containing information relating to tracking locations of vehicles. The overlay protocol can determine which ledger a particular ledger message/information corresponds to. The overlay protocol can then create and add a block corresponding to that ledger message/information to the ledger identified for that ledger message/information. Accordingly, ledger messages/information relating to the images captured by the one or more UAVs can be added to the first ledger, and ledger messages/information relating to tracking locations of vehicles can be added to the second ledger. Each of these ledgers can be forked and merged as discussed above in a manner that is independent from other ledgers. That is, forked ledgers from the first ledger are merged with the main first ledger and forked ledgers from the second ledger are merged with the main second ledger. Any number of ledgers can be concurrently maintained in this way.

FIG. 12 is a block diagram of an example peer device 102-1 implementing the ledger protocol. In an example, the peer device 102-1 can be an end-user device (e.g., a mobile phone, tactical radio). In another example, the peer device 102-1 can be a networking device (e.g., a router) configured to implement routing protocols (e.g., IP) for the network 100 in addition to the ledger protocol. In yet another example, the peer device 102-1 can be a standalone network appliance installed within the (IP) network 100 to implement the ledger protocol in the network 100.

In any case, the peer device 102-1 has ledger software 1210 thereon to implement the ledger protocol described herein. The ledger software 1210 includes overlay network software 1211 to implement the overlay network protocols as described herein that integrate with the ledger functions. The peer device 102-1 can include one or more processing devices 1202 to execute the instructions of the ledger software 1210. The one or more processing devices 1102 can include a general-purpose processor or a special purpose processor. The instructions of the ledger software 1210 are stored (or otherwise embodied) on or in an appropriate storage medium or media 1206 (such as a flash or other non-volatile memory) from which the instructions are readable the processing device(s) 1202 for execution thereby. The peer device 102-1 also includes memory 1204 that is coupled to the processing device(s) 1202 for storing instructions (and related data) during execution by the processing device(s) 1202. Memory 1204 comprises, in one implementation, any suitable form of random-access memory (RAM) now known or later developed, such as dynamic random-access memory (DRAM). In other implementations, other types of memory are used.

The instructions of the ledger software 1210, when executed by the one or more processing devices 1202, cause the one or more processing devices 1202 to perform the actions (or a portion thereof) of a peer 102-1 described herein. This includes the actions relating to creating and maintaining ledgers, sending and routing ledger messages/ information, and implementing an overlay protocol—including an overlay routing protocol as described herein.

The peer device 102-1 also includes one or more network interfaces 1214 for communicating with other ledger and non-ledger devices 102 in the network 100. The one or more network interfaces 1214 can be coupled to the one or more processing devices 1202. The one or more network interfaces 1214 can include wired and/or wireless interfaces such as an Ethernet interface, a satellite transceiver, an IEEE 802.11 transceiver, a cellular transceiver, or other interface.

FIG. 13 is a block diagram of an example software product 1300 that includes ledger software 1210. The software product 1300 includes a computer readable medium 1302 including ledger software 1210 that can be loaded onto an appropriate hardware device. The ledger software 1210 includes instructions that are stored or otherwise embodied on the computer readable medium 1302. The ledger software 1210 can be loaded onto an appropriate hardware device, such as peer 1200, for the hardware device to execute the instructions and perform the functionality (or a portion thereof) of a peer device 102-1 as described herein. The computer readable medium 1202 on which the ledger software 1210 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable medium within a computing device (e.g., a server or network accessible storage).

FIGS. 14A-14C depict an example implementation of the ledger software 1210. Two UAVs 1402, 1403 (which are peer devices 102-1) are mapping a geographical area. UAV1 1402 is mapping the northern part, while UAV2 1403 is mapping the southern part. In an example, both UAVs 1402, 1402 generate 100 pixels per second. The pixel information is to be captured in a ledger database by the ledger software 1210.

While both UAVs 1402, 1403 are coupled to the core peer 1404 as shown in FIG. 14A, the messages from both UAVs 1402, 1403 with pixel information are transmitted across the network to the core peer 1404. The core peer 1404 builds the main ledger and disseminates its blocks across the network. Both UAVs 1402, 1403 receive blocks committed to the main ledger, which includes pixel information for both northern and southern parts.

When the link between the leader peer 1406 and the core peer 1404 ceases to exist as shown in FIG. 14B, the leader 1406 initializes a local ledger. The leader 1406 creates blocks based on messages from UAV1 1402 and disseminates the blocks to locally connected peers such as UAV1 1402. UAV1 1402 uses the local ledger to store and access the map information. As a result, UAV1 1402 will continue to store and display the upper half of the map, without losing the lower half data that is already stored in the ledger before the link with the core 1404 ceased. UAV2 1403 will continue to use the main ledger to store and display the lower part, without losing data that already exists in ledger before the link ceased. The images of on FIGS. 14A-14C illustrate the ledger information available to UAV1 1402 continuing to have the upper part growing while the lower part is static. Similarly, the ledger information available to UAV2 1403 continues to have the lower part growing while the upper part is static.

As shown in FIG. 14C, when the link between the leader 1406 and the core 1404 is repaired, the leader 1406 and the core 1404 cooperate to merge the local ledger into the main ledger. The leader 1406 stops generating local blocks and sends the local ledger blocks to the core 1404. The core can merge the local blocks into the main ledger and continues generating new blocks from new messages received from both UAVs 1402, 1403. As a result, both UAVs have access to the two halves of the map without data loss after reconnection of the peers.

What is claimed is:

1. A program product comprising:
  a non-transitory processor readable medium having software stored thereon, the software, when executed by one or more processing devices, configured to:
    send and receive messages between a first peer and one or more second peers to maintain a distributed ledger;
    implement an overlay routing protocol to monitor one or more overlay links between the first peer and the one or more second peers of the distributed ledger, wherein the software is configured to select an overlay routing scheme for distribution of ledger information or blocks to the one or more second peers based on one or more characteristics of the overlay links of the one or more second peers; and
    in response to detecting the one or more second peers becoming disconnected from the first peer, adjust how blocks for the distributed ledger are formed.

2. The program product of claim 1, wherein adjust how blocks for the distributed ledger are formed includes create a forked ledger for the one or more second peers, wherein the first peer participates in maintaining a main ledger while the one or more second peers are disconnected.

3. The program product of claim 2, wherein the software is configured to merge the forked ledger with the main ledger in response to detecting the one or more second peers having reconnected to the first peer.

4. The program product of claim 1, wherein the software is configured to limit block creation and commitment in an edge network by sending ledger information from the edge network to a core network and receiving blocks corresponding to the ledger information from the core network.

5. The program product of claim 1, wherein the one or more characteristics of the overlay links include a stability of the overlay links, wherein select an overlay routing scheme includes select a minimum spanning tree (MST) routing scheme in response to a stability that is above a threshold and select a control flooding routing scheme in response to a stability that is below the threshold.

6. The program product of claim 5, wherein select an overlay routing scheme includes select parameters of the MST routing scheme based on characteristics of ledger information being sent for the ledger.

7. The program product of claim 1, wherein the software is configured to select one or more neighbors from the one or more second peers based on network paths to the one or more second peers.

8. A device comprising:
  one or more processing devices;
  storage media communicatively coupled to the one or more processing devices, the storage media including software stored thereon, the software, when executed by the one or more processing devices, configured to:
    send and receive messages between a first peer and one or more second peers to maintain a distributed ledger;
    implement an overlay routing protocol to monitor one or more overlay links between the first peer and the one or more second peers of the ledger, wherein the software is configured to select an overlay routing scheme for distribution of ledger information or blocks to the one or more second peers based on one or more characteristics of the one or more second peers; and
    in response to detecting the one or more second peers becoming disconnected from the first peer, adjust how blocks for the distributed ledger are formed.

9. The device of claim 8, wherein adjust how blocks for the ledger are formed includes create a forked ledger for the one or more second peers, wherein the first peer participates in maintaining a main ledger while the one or more second peers are disconnected.

10. The device of claim 9, wherein the software is configured to merge the forked ledger with the main ledger in response to detecting the one or more second peers having reconnected to the first peer.

11. The device of claim 8, wherein the software is configured to limit block creation and commitment in an edge network by sending ledger information from the edge network to a core network and receiving blocks corresponding to the ledger information from the core network.

12. The device of claim 8, wherein the one or more characteristics of the overlay links include a stability of the overlay links, wherein select an overlay routing scheme includes select a minimum spanning tree (MST) routing scheme in response to a stability that is above a threshold and select a control flooding routing scheme in response to a stability that is below the threshold.

13. The device of claim 12, wherein select an overlay routing scheme includes select parameters of the MST routing scheme based on characteristics of ledger information being sent for the ledger.

14. The device of claim 8, wherein the software is configured to select one or more neighbors from the one or more second peers based on network paths to the one or more second peers.

15. A method for one or more ledgers comprising:
sending and receiving messages between a first peer and one or more second peers to maintain a ledger;
implementing an overlay routing protocol to monitor one or more overlay links between the first peer and one or more second peers of the ledger, wherein the software is configured to select an overlay routing scheme for distribution of ledger information or blocks to the one or more second peers based on one or more characteristics of the one or more second peers; and
in response to detecting the one or more second peers becoming disconnected from the first peer, adjusting how blocks for the ledger are formed.

16. The method of claim 15, wherein adjusting how blocks for the ledger are formed includes creating a forked ledger for the one or more second peers, wherein the first peer participates in maintaining a main ledger while the one or more second peers are disconnected.

17. The method of claim 16, comprising:
merging the forked ledger with the main ledger in response to detecting the one or more second peers having reconnected to the first peer.

18. The method of claim 15, limiting block creation and commitment in an edge network by sending ledger information from the edge network to a core network and receiving blocks corresponding to the ledger information from the core network.

* * * * *